United States Patent [19]

Nakamura

[11] 4,172,548

[45] Oct. 30, 1979

[54] METHOD OF FLUXLESS BRAZING FOR ALUMINUM STRUCTURES

[75] Inventor: Masakazu Nakamura, Takarazuka, Japan

[73] Assignee: Sumitomo Precision Products Company, Limited, Hyogo, Japan

[21] Appl. No.: 865,399

[22] Filed: Dec. 29, 1977

[30] Foreign Application Priority Data

Dec. 29, 1976 [JP] Japan .................................. 51-160151

[51] Int. Cl.² ........................... B23K 1/20; C21D 1/26
[52] U.S. Cl. ..................................... 228/183; 228/203; 228/232; 148/11.5 A
[58] Field of Search ............... 228/164, 173 C, 173 D, 228/183, 203, 232; 148/11.5 A

[56] References Cited

U.S. PATENT DOCUMENTS

| 2,254,853 | 9/1941 | Mouromtseff et al. .......... 228/203 X |
| 3,498,849 | 3/1970 | Munday et al. ................ 148/11.5 A |
| 3,966,506 | 6/1976 | Mandigo et al. ............... 148/11.5 A |
| 4,033,504 | 7/1977 | Fletcher et al. ................ 228/232 X |
| 4,053,969 | 10/1977 | Bayard .............................. 228/183 X |
| 4,072,542 | 2/1978 | Murakado et al. ............ 148/11.5 A |
| 4,077,810 | 3/1978 | Ohuchi et al. .................. 148/11.5 A |

Primary Examiner—Francis S. Husar
Assistant Examiner—K. J. Ramsey
Attorney, Agent, or Firm—Oblon, Fisher, Spivak, McClelland & Maier

[57] ABSTRACT

Failure under stress of brazed aluminum assemblies prepared by fluxless brazing is prevented by controlling the grain size before brazing of the material in contact with the brazing alloy to be at least 60μ.

3 Claims, 11 Drawing Figures

METHOD OF FLUXLESS BRAZING FOR ALUMINUM STRUCTURES

BACKGROUND OF THE INVENTION

This invention relates to methods of joining aluminum by brazing and, more particularly, to a method for brazing aluminum and its alloys without the use of a flux. It also relates to manufacture of large aluminum assemblies such as heat exchangers by fluxless brazing.

Most aluminum structures which are made up of parts joined by brazing are at present prepared by furnace brazing or dip brazing using a flux. Furnace brazing is generally used for relatively small articles, while dip brazing is used for relatively large objects.

For example, in manufacturing a large heat exchanger by dip brazing, the assembled structure is preheated to about 550° C. in a hot air furnace, then immersed in the flux at about 590° to 620° C. The flux removes the oxidized film on the surface of the aluminum members and prevents reoxidation of the surface. At the same time, the assembly is rapidly heated to the brazing temperature by virtue of the large heat capacity of the flux and brazed into one unit. Large heat exchangers having dimensions up to about 1200 mm wide, 1200 mm high and 7000 mm long are manufactured by this method.

Since, however, the fluxes used for brazing consist principally of chlorides and fluorides, they are very corrosive toward aluminum. Hence, careful cleaning is required after brazing with accompanying expenditure of money and time. In view of this, brazing without using flux, or fluxless brazing, is beginning to receive attention.

Fluxless brazing is carried out either in vacuum or in an inert gas atmosphere. The structure to be brazed is heated in a furnace, by radiation in the case of heating in vacuum, by radiation and convection in the case of an inert gas atmosphere. The brazing cycle is generally completed within one hour when the object to be brazed is small, such as a condenser or an evaporator of an automobile air conditioner. When large heat exchangers as described above, or the like, are to be brazed, however, it may take as long as 24 hours or more to attain the brazing temperature of 590° to 610° C., because the large heat capacity of the flux is not available as in dip brazing.

In a brazing process which requires a long heating period, as in the case of manufacturing a large structure by fluxless brazing, the behavior of Si, Mg or similar elements in the brazing alloy must be considered.

This problem and the improvement afforded by this invention can be better understood by reference to the accompanying drawings, in which.

Figure 7A:
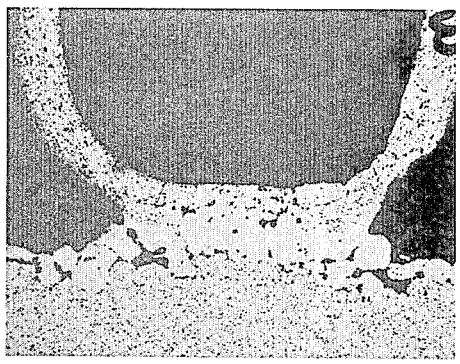

FIGS. 7a, b, c are photomicrographs of cores A, B and C of the Example respectively after testing to destruction.

Figure 1:
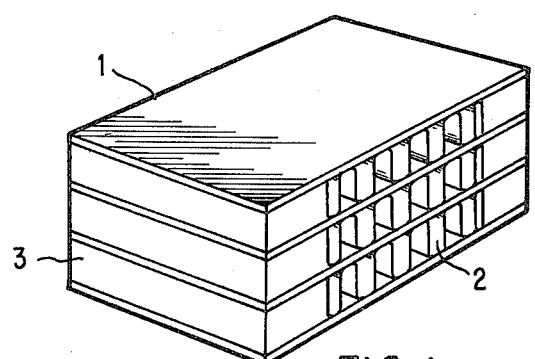
FIG. 1 is a perspective illustration of the core of an aluminum heat exchanger.

Referring now to FIG. 1, for example, the corrugated fin 2 is located in the center, and the side bars 3 at both sides of the space between the separator plates 1, and such sections are stacked up to form the core of a heat exchanger. Normally the side bar 3 is made of extruded aluminum bar and the corrugated fin is made of thin aluminum plate of 0.1 to 0.8 mm thickness. For the separator plate 1, brazing sheet, which is a clad sheet made of aluminum alloy base metal having brazing alloy bonded to both sides by compression is generally used; however, bare aluminum can also be used by placing foils of brazing alloy on both surfaces.

Figure 2:
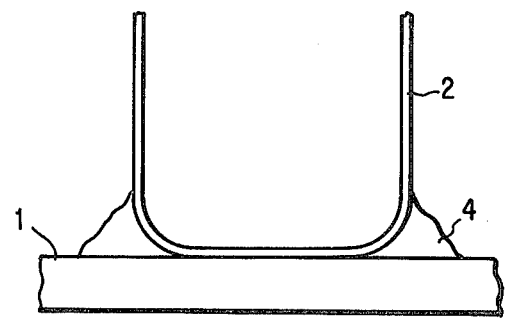
FIG. 2 is an enlarged partial view showing the fillet at the time of brazing.

When these members are assembled and heated in vacuum or in an inert atmosphere, the brazing alloy melts and fillets 4 are formed at the contacting corner portions of members 1 and 2, for example, as shown in FIG. 2. However, in the case of a large heat exchanger which must be heated for about 24 hours as described, the temperature difference between the inside and the outside of the core may be as large as 100° to 200° C., and several hours are required for the inner part of the core to reach the brazing temperature after the outer parts of the core have attained it.

During this long heating cycle, Si, Mg, or other elements of the brazing alloy may diffuse from the molten brazing alloy in the outer portions of the core which was initially of the eutectic composition, into the base material of the separator 1 or the corrugated fin 2, and the fillet disappears.

When such diffusion occurs, the melting point of the aluminum alloy decreases and it begins to melt or at least to lose strength so that the structure becomes too weak for use in a heat exchanger. Such a process is likely to occur in a thin plate member. For example, in the case of a heat exchanger, it was confirmed by testing that the defect is liable to occur in the thin finned parts.

Figure 3:
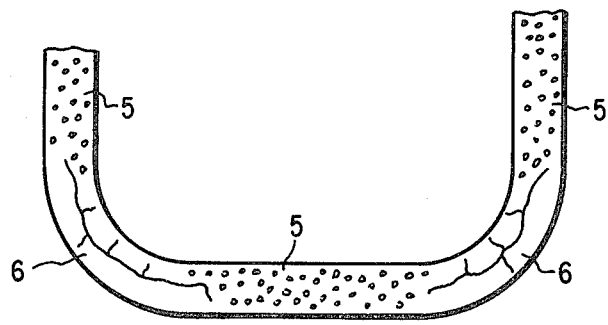
FIG. 3 is a partial sectional view of the fin material after preheating for brazing indicating the crystal structure of the section.

Usually, the plate thickness of a heat exchanger fin is 0.1 to 0.8 mm. It is heat treated to soften it before being corrugated for use as the fin, and the grain size after recrystallization is 30μ or less. When this sheet is preheated for brazing after corrugation, crystallized grains grow at the worked portion 6, (FIG. 3) but the grain size in the unworked portion 5 (FIG. 3), remains as it was, as shown in FIG. 3.

Now, when Si or another element in the brazing alloy diffuses into the aluminum base metal, it diffuses more easily at the grain boundary than into the grain itself. Therefore, Si, Mg and other elements in the fillet diffuse into the portion having small crystal grains 5, resulting in failure of the fillet or melting of the fin.

Hence, a need exists for a method of fluxless brazing which would prevent the detrimental effects of this diffusion with accompanying weakness of the brazed aluminum structure.

BRIEF DESCRIPTION OF THE INVENTION

Accordingly, it is an object of this invention to provide a method for fluxless brazing of aluminum structures wherein weakening of the members of the structure is avoided.

A further object is to prevent diffusion of Si, Mg and other elements from the brazing alloy into the brazed aluminum alloy members during fluxless brazing.

A further object is to provide an improved method for making large aluminum structures such as heat exchangers by fluxless brazing.

The objects of this invention have now been achieved by controlling the grain size in the members of an aluminum structure to be joined by fluxless brazing to be 60μ or more immediately prior to the brazing.

This control may be accomplished by means well known to those skilled in the art. A convenient method is to use a combination of cold-working followed by annealing. The amount of cold-working and the conditions for annealing to produce a crystal grain size greater than 60μ are easily determinable by the skilled practitioner. A preferred method is a 20% cold-working of the aluminum alloy followed by annealing.

The method of this invention is particularly effective when used with thin aluminum alloy sheets such as those used for separators and fins in heat exchangers. It is useful particularly in making large heat exchangers by fluxless brazing wherein the molten brazing material may be in contact with the aluminum alloy members in the outer portions of the exchanger for a relatively long time while the inner part of the assembly is being heated to brazing temperature.

The invention will now be illustrated by an example of the use of the procedure of this invention to prepare a heat exchanger core by fluxless brazing. Control and comparison examples are also provided. This example is not intended to limit the scope of the invention.

Control Example (Prior Art): A heat exchanger core as illustrated in FIG. 1 was assembled using a 1.2 mm thick brazing sheet (basic material, 3003; brazing material, 4004; thickness of brazing material, 10%; crystal grain size of core, about 50μ) as separator plate 1, a side bar 3 (material, 3003; crystal grain size, about 35μ), and a fin 2 (material, 3003; thickness, 0.2 mm; crystal grain size, about 35μ). Fluxless brazing was then carried out in a vacuum furnace using a brazing cycle of 21 hours (6 hours at a temperature of 550° C. or more). A marked diffusion of Si to the fin material side was observed, and the core was broken by the pressure test showing that it does not have sufficient strength for use as a heat exchanger.

Figure 4:
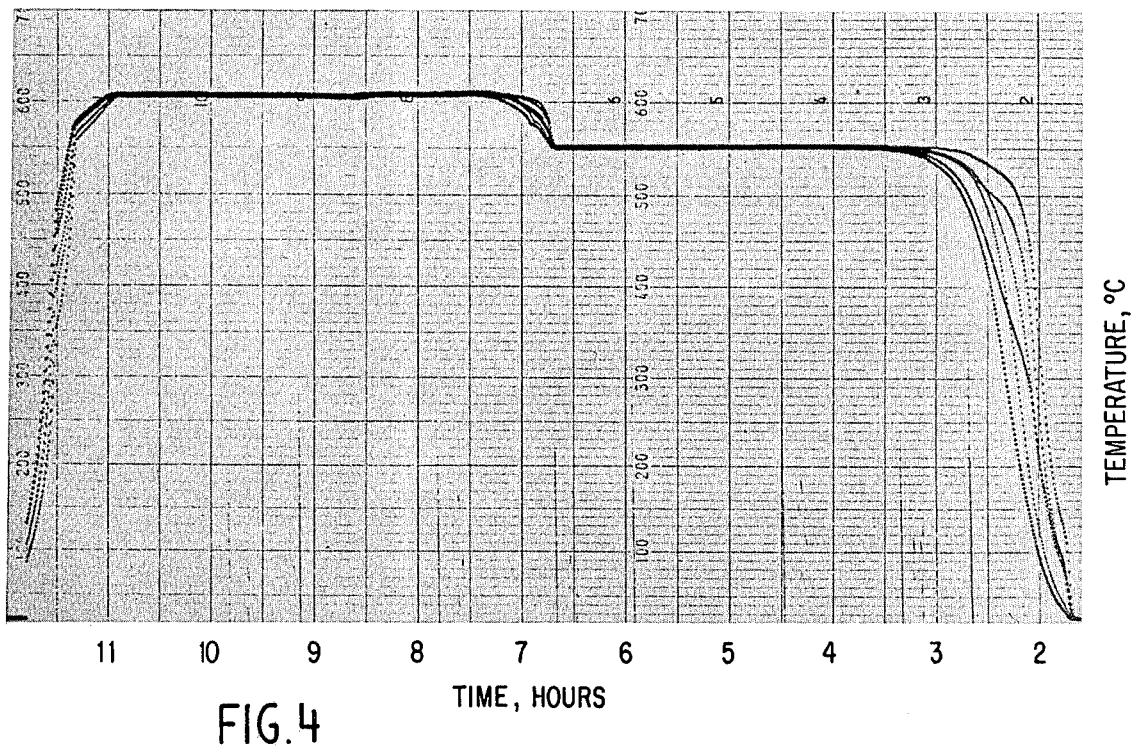
FIG. 4 is an example of the heating program of brazing.

Example of This Invention (with comparisons): The above heating cycle is typical for brazing a core of such dimensions by the hitherto known technique. For the purpose of demonstrating the advantages of the process of this invention, a comparison brazing test was performed under more severe conditions than for the control example (cumulative 8 hours of heating at 550° C. or above, of which about 4 hours was at 610° C., refer to the temperature program of FIG. 4).

The aluminum structures subjected to the brazing test were heat exchanger cores of the same kind as the control, assembled from 1.2 mm thick brazing sheet (base material, 3003; brazing material, 4004; thickness of brazing material, 10%) as separator plates, side bars (material, 3003), and fins (material, 3003; thickness, 0.2 mm).

Figure 5A:
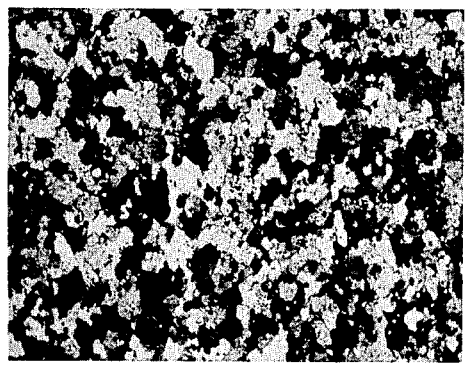
FIG. 5a is a photomicrograph showing the crystal structure of the corrugated fin of core A in the Example.
Figure 5B:
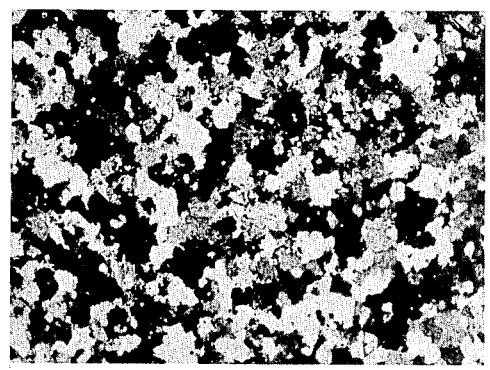
FIG. 5b is a photomicrograph showing the crystal structure of the brazing sheet of core A in the Example.

Both the corrugated fin and the brazing sheet of test core A were not controlled for the crystal grain size, consequently the crystal grain size of the non-worked portion of the corrugated fin was about 35μ (see FIG. 5a) and the crystal grain size of the base metal of the brazing sheet was about 50μ (see FIG. 5b).

Figure 6A:
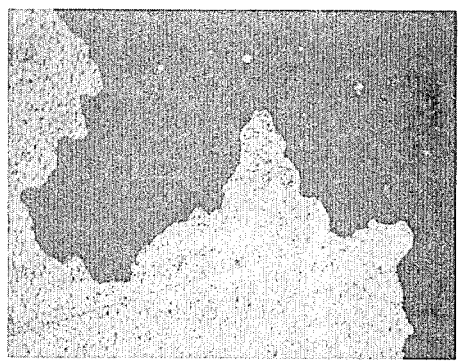
FIG. 6a is a photomicrograph showing the crystal structure of the corrugated fin of core B in the Example.
Figure 6B:
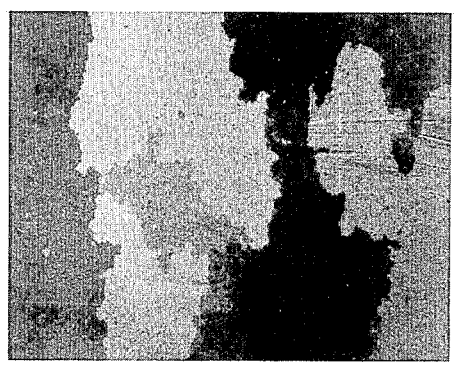
FIG. 6b is a photomicrograph showing the crystal structure of the brazing sheet of core B in the Example.

On the other hand, the fin material for the test core B (recrystallized material) was subjected to about 20% cold work, and an annealing treatment was carried out before it was corrugated to form the fin. As a result, the grain size of the unworked portion (Reference No. 5 in FIG. 3) was about 300μ to 1000μ (see FIG. 6a), and the brazing sheet for the separator plate was also 20% cold worked to make the crystal grain size 300μ to 1000μ (see FIG. 6b) immediately prior to the brazing.

Further, for another test core C, the grain size of the corrugated fin was not controlled and was the same as that of test core A above, while the separator plate was the same brazing sheet used for test core B.

Figure 7B:
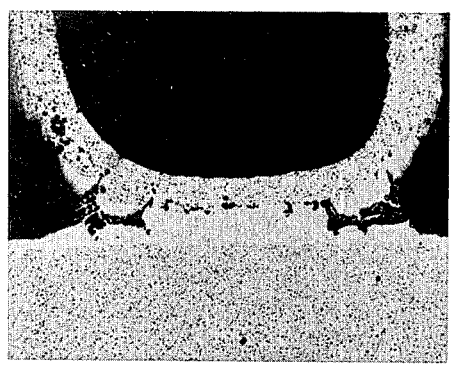
Figure 7C:
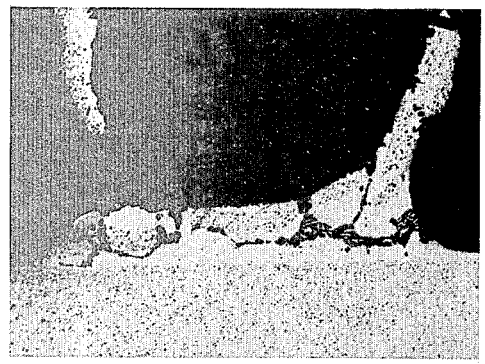

Each finished brazed core was then endurance tested by repeated application of a pressure of 15.8 kg/cm² (225 psi). Core A failed at 60,945 cycles, core B at 738,000 cycles, and core C was destroyed on the first cycle of the test. This destruction is believed to be caused by the eutectic melting of the fin material because of diffusion of Si, during the long heating period. Each of the tested cores were sectioned after failure, and photomicrographs of the brazed joints between the fin and brazing sheet are shown in FIG. 7. FIG. 7a is the photomicrograph of core A, FIG. 7b is that of core B and FIG. 7c is that of core C.

As seen from the photomicrographs, the deficiency of the fillet is notable in core A, and cavities from the melting of eutectic crystals are seen in the fin of core C. However, no such defects can be seen in core B which exhibited sufficient strength as a heat exchanger when tested by the described endurance test.

Having now fully described the invention, it will be apparent to one of ordinary skill in the art that many changes and modifications can be made thereto without departing from the spirit or scope of the invention as set forth herein.

I claim:

1. In a method of joining aluminum alloy members of a structure by fluxless brazing by applying fluxless brazing alloy between said aluminum members to be joined and heating said members to effect brazing thereof, the improvement comprising:

employing as said aluminum alloy members, aluminum alloy material which has been treated such that the crystal grain size of the alloy material is at least 60 μm.

2. The method according to claim 1, wherein said aluminum alloy structure comprising at least one relatively thin member joined to a relatively thick member, and a grain size of the alloy of the thinner member is at least 60 μm.

3. The method according to claim 2 wherein said aluminum alloy structure is the core of a heat exchanger and the thin member of the structure is the fin of said heat exchanger.

* * * * *